United States Patent [19]

Kinugasa et al.

[11] Patent Number: 4,460,522

[45] Date of Patent: Jul. 17, 1984

[54] METHOD OF PRODUCING LOW DENSITY OXIDE FUEL PELLET

[75] Inventors: Manabu Kinugasa, Katsuta; Hiromitsu Kaneko, Ibaraki, both of Japan

[73] Assignee: Doryokuro Kakunenryo Kaihatsu Jigyodan, Tokyo, Japan

[21] Appl. No.: 474,351

[22] Filed: Mar. 11, 1983

[30] Foreign Application Priority Data

Sep. 14, 1982 [JP] Japan .................. 57-160045

[51] Int. Cl.³ .................. G21C 21/00; G21C 3/62
[52] U.S. Cl. .................. 264/0.5; 252/637; 252/638
[58] Field of Search .................. 264/0.5; 252/638, 640

[56] References Cited

U.S. PATENT DOCUMENTS

| | | | |
|---|---|---|---|
| 2,290,107 | 7/1942 | Luks | 501/119 |
| 3,355,393 | 11/1967 | Swanson | 264/0.5 X |
| 3,504,058 | 3/1970 | Masselot | 264/0.5 |
| 3,625,680 | 12/1971 | Asbury | 264/0.5 X |
| 3,751,538 | 8/1973 | Flipot et al. | 264/0.5 |
| 3,953,286 | 4/1976 | Watson et al. | 264/0.5 X |

OTHER PUBLICATIONS

Sintering Characteristics of $PuO_2$–$UO_2$ Mixed Pellets (III)–Doping Effects, M. Kinugasa et al., a paper given at the 1982 Ann. Meeting of the Atomic Energy Society of Japan, 2nd volume, published 3-15-82.

*Primary Examiner*—Brooks H. Hunt
*Assistant Examiner*—Virginia Caress
*Attorney, Agent, or Firm*—Wenderoth, Lind & Ponack

[57] ABSTRACT

A method of producing an oxide fuel pellet having a low density is provided which comprises adding a manganese compound to an oxide fuel powder selected from a group consisting of uranium dioxide powder and a mixed powder of uranium dioxide and plutonium dioxide, in an amount of 0.01 to 5.0% by weight based on the weight of the oxide fuel powder, molding the resulting mixture into a pellet form, and sintering the pellet-formed mixture at a temperature of 1,200° to 1,700° C.

5 Claims, 3 Drawing Figures

4,460,522

METHOD OF PRODUCING LOW DENSITY OXIDE FUEL PELLET

BACKGROUND OF THE INVENTION

This invention relates to a method of producing an oxide fuel pellet having a low density useful for a light water reactor, a fast breeder reactor, and so forth.

A low density fuel pellet is of the utmost importance as a nuclear fuel for a nuclear reactor in which high burnup is required, because it can reduce swelling due to radiation as well as mechanical interaction between pellets and a cladding tube. However, a method of producing such a low density pellet has not yet been established. The method that has been generally practised is to add pyrolytic organic substances such as polyethylene or starch to an oxide fuel powder so as to increase pores in the resulting pellet and thus to reduce the density thereof.

This method makes it possible to control the density of the resulting pellet to some extent by adjusting the quantity of addition of the organic substances, but since the quantity of volatile impurities that are sealed in the pores increases, there have been observed some problems that micro-cracks develop around the pores depending upon the kind of the organic substances to be added and that the pellet itself undergoes deformation.

SUMMARY OF THE INVENTION

An object of the present invention is therefore to eliminate these problems in the prior art and to provide a method of producing a stable oxide fuel pellet having a low density which undergoes less deformation during radiation.

It is extremely difficult to control, with a high reproducibility, the density of fuel pellet which is produced by sintering various kinds of oxide fuel powder having varying properties, because there are a large number of factors that affect the sintering characteristics of the pellet such as, for example, the difference of the starting mother salts, the calcining condition, the plutonium content, the molding condition, the sintering condition, and so forth. We have examined the sintering characteristics of the pellet by adding various kinds of additives to uranium dioxide powder or to a mixture of uranium dioxide powder and plutonium dioxide powder, and have found that an extremely peculiar phenomenon, which did not occur when no additive was used or which was quite different from when additives of other kinds were used, occurred when a manganese compound was used as the additive. In other words, it has been found that a low density, stable, oxide fuel pellet could be produced with a high reproducibility by adding a suitable amount of the manganese compound to the oxide fuel powder and then molding and sintering the mixture. The present invention was completed on the basis of the finding described above.

According to the present invention, a low density, stable oxide fuel pellet can be produced by adding a manganese compound to an oxide fuel powder selected from a group consisting of uranium dioxide powder and a mixed powder of uranium dioxide and plutonium dioxide, in an amount of 0.01 to 5.0% by weight based on the weight of the oxide fuel powder, molding the resulting mixture into a pellet form, and sintering the pellet-formed mixture at a temperature of 1,200° to 1,700° C.

The manganese compound may be either an inorganic manganese compound such as manganese dioxide, manganese carbonate or the like or an organic manganese compound such as manganese formate, manganese acetate, manganese butyrate, manganese benzoate, manganese acetylacetonate, manganese alkoxides or the like. If the amount of addition of the manganese compound is below 0.01% by weight, the effect of addition would not be obtained. If it is above 5.0% by weight, on the contrary, the effect of addition does not increase any longer, the pellet strength would rather drop and the pellet would be likely to undergo deformation. The addition range of 0.5 to 2.0% by weight is preferred. The sintering temperature is stipulated to fall within the range of from 1,200° to 1,700° C. because the density and shrinkage factor of the sintered pellet reach substantially uniform values at a temperature of at least 1,200° C. This sintering temperature will be further described hereinbelow.

DETAILED DESCRIPTION OF THE PREFERRED EMBODIMENT

Figure 1:
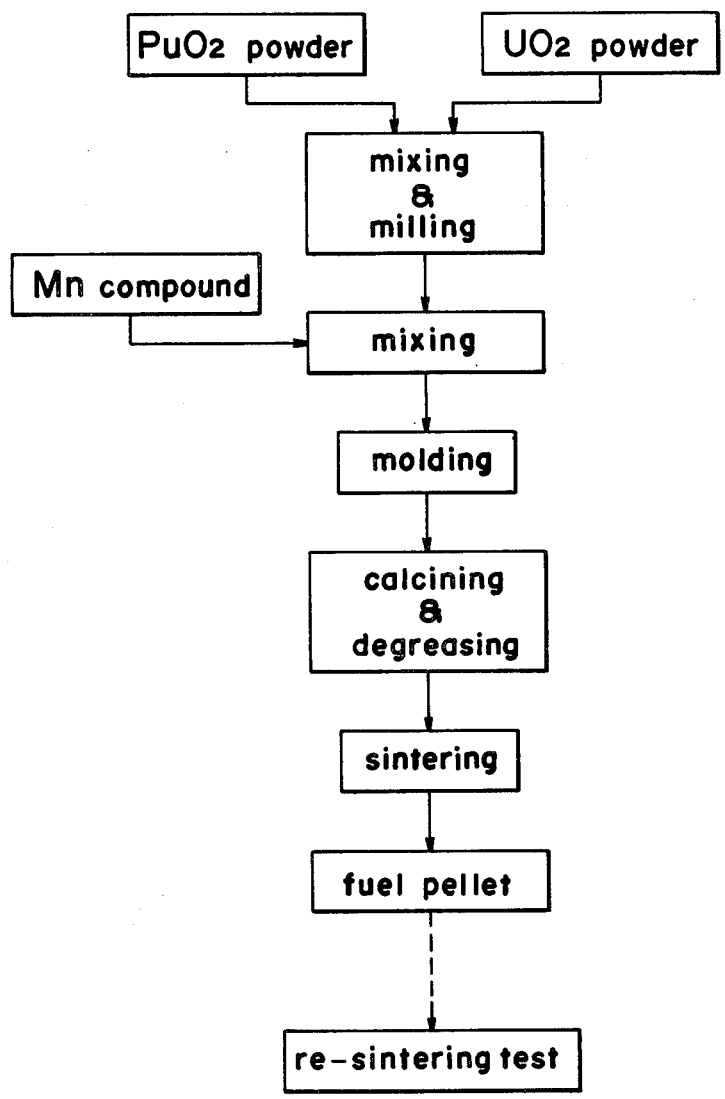
FIG. 1 is a flow chart showing an embodiment of the method of the present invention.

Referring to FIG. 1, there is illustrated a flow chart for the production and inspection of a mixed oxide fuel pellet according to the present invention. $PuO_2$ powder and $UO_2$ powder are mixed and milled, and then a manganese compound is added to the mixed powder of $PuO_2$ and $UO_2$ in an amount of 0.01 to 5.0% by weight based on the weight of the mixed powder of $PuO_2$ and $UO_2$. After a binding agent is conventionally admixed, the mixture is press-molded at a molding pressure of about 4 ton/cm² to form a pellet. The resulting pellet is calcined at 800° C. for 2 hours to degrease and is then sintered. The sintering temperature is from 1,200° to 1,700° C. and the sintering atmosphere is a mixed gas of an inert gas and hydrogen. The resulting fuel pellet thus sintered is subjected to the re-sintering test. The re-sintering temperature is 1,700° C. and the sintering atmosphere is a mixed gas of an inert gas and hydrogen. As one of the out-pile tests for evaluating the fuel pellet, this re-sintering test is generally carried out to examine the degree of densification of the pellet, the degree of deformation of the pellet, the change of the metallic phase (change of composition), and the like. As a result of this re-sintering test, it has been confirmed that the fuel pellet produced in accordance with the present invention hardly exhibits dimensional change in the re-sintering test at 1,700° C. even if it was previously sintered at 1,200° C., and has a low density (70 to 92% T.D.).

EXAMPLE 1

$PuO_2$ powder and $UO_2$ powder were mixed in a ball mill so that $PuO_2$ content became 28.5% by weight. To this mixed powder of $PuO_2$ and $UO_2$ was added manganese dioxide ($MnO_2$) in an amount of 0.5% by weight. The mixture was then molded into a pellet form and was sintered at 1,650° C. in the atmosphere of a mixed gas of an inert gas and hydrogen. The thus sintered pellet had a relative density of 85% T.D. (9.3 g/cm$^3$) and a manganese content of less than 20 ppm.

The relative density of the sintered pellet, when manganese was not added, was 90% T.D.

EXAMPLE 2

PuO$_2$ powder and UO$_2$ powder were mixed in a ball mill so that PuO$_2$ content became 28.5% by weight. To this mixed powder of PuO$_2$ and UO$_2$ was added manganese (II) acetylacetonate in an amount, as MnO$_2$, of 0.5% by weight. The mixture was then molded into a pellet form and was sintered at 1,200° C. in the atmosphere of a mixed gas of inert gas and hydrogen.

The thus sintered pellet had a relative density of 82% T.D. (9.1 g/cm$^3$) and a manganese content of less than 40 ppm.

EXAMPLE 3

PuO$_2$ powder and UO$_2$ powder were mixed in a ball mill so that PuO$_2$ content became 30% by weight. To this mixed powder of PuO$_2$ and UO$_2$ was added manganese formate in an amount of 0.5% by weight. The mixture was then molded into a pellet form and was sintered at 1,300° C. in the atmosphere of a mixed gas of inert gas and hydrogen. The thus sintered pellet had a relative density of 91% T.D. (10.1 g/cm$^3$) and a manganese content of less than 40 ppm.

The relative density, when manganese was not added, was 95% T.D. (at a sintering temperature of 1,650° C.).

EXAMPLE 4

1.0% by weight of manganese dioxide was added to UO$_2$ powder and was mixed in a ball mill. The mixture was molded into a pellet form and was sintered at 1,650° C. in the atmosphere of a mixed gas of an inert gas and hydrogen. The thus sintered pellet had a relative density of 89% T.D. (9.8 g/cm$^3$) and a manganese content of less than 40 ppm.

The relative density, when manganese was not added, was 94% T.D.

EXAMPLE 5

To a mixed solution of uranyl nitrate and plutonium nitrate was applied microwave energy to directly convert the solution into a mixed powder of PuO$_2$/UO$_2$=1/1. UO$_2$ powder was added to the resulting mixed powder of PuO$_2$ and UO$_2$ so that PuO$_2$ content became 30% by weight. Manganese carbonate was then added to the mixed oxide powder in an amount, as MnO$_2$, of 0.5% by weight. The mixture was then molded into a pellet form and was sintered at 1,200° C. in the atmosphere of a mixed gas of inert gas and hydrogen.

The thus sintered pellet had a relative density of 91% T.D. (10.1 g/cm$^3$) and a manganese content of less than 40 ppm.

The relative density, when manganese was not added, was 95% T.D. (at a sintering temperature of 1,650° C.).

Figure 2:
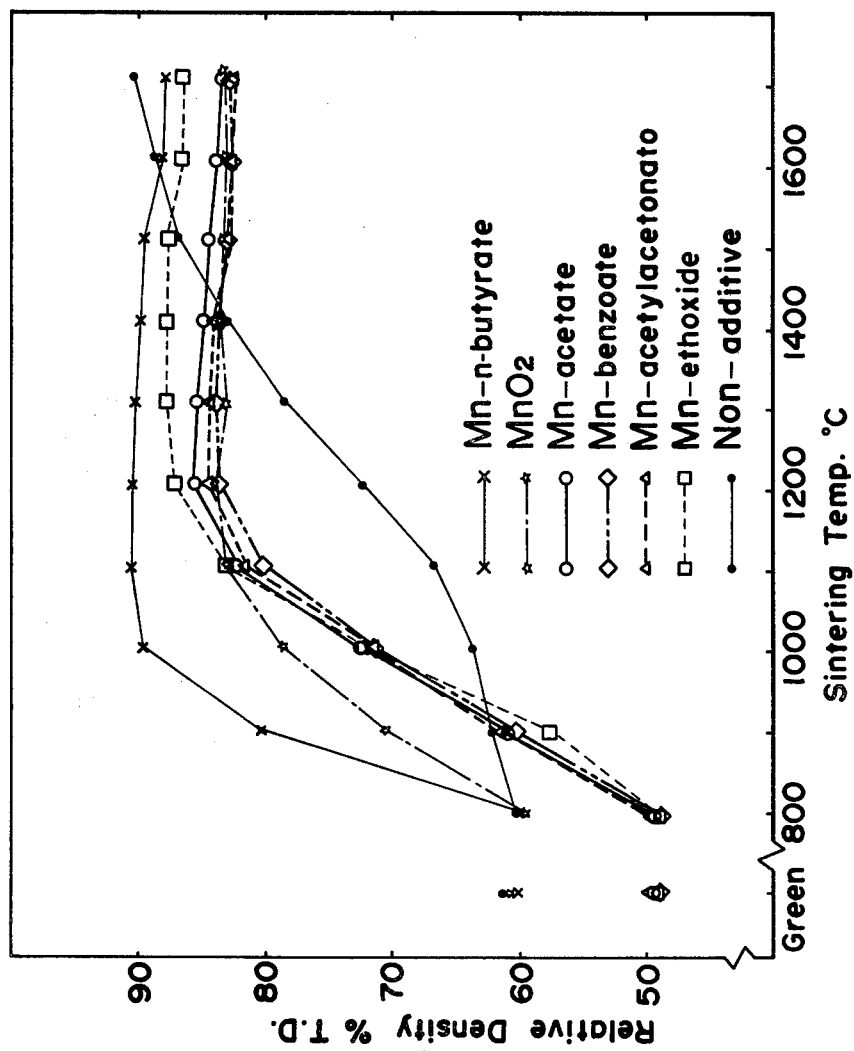
FIG. 2 is a graph showing the relation between the sintering temperature and the relative density of the sintered pellet.
Figure 3:
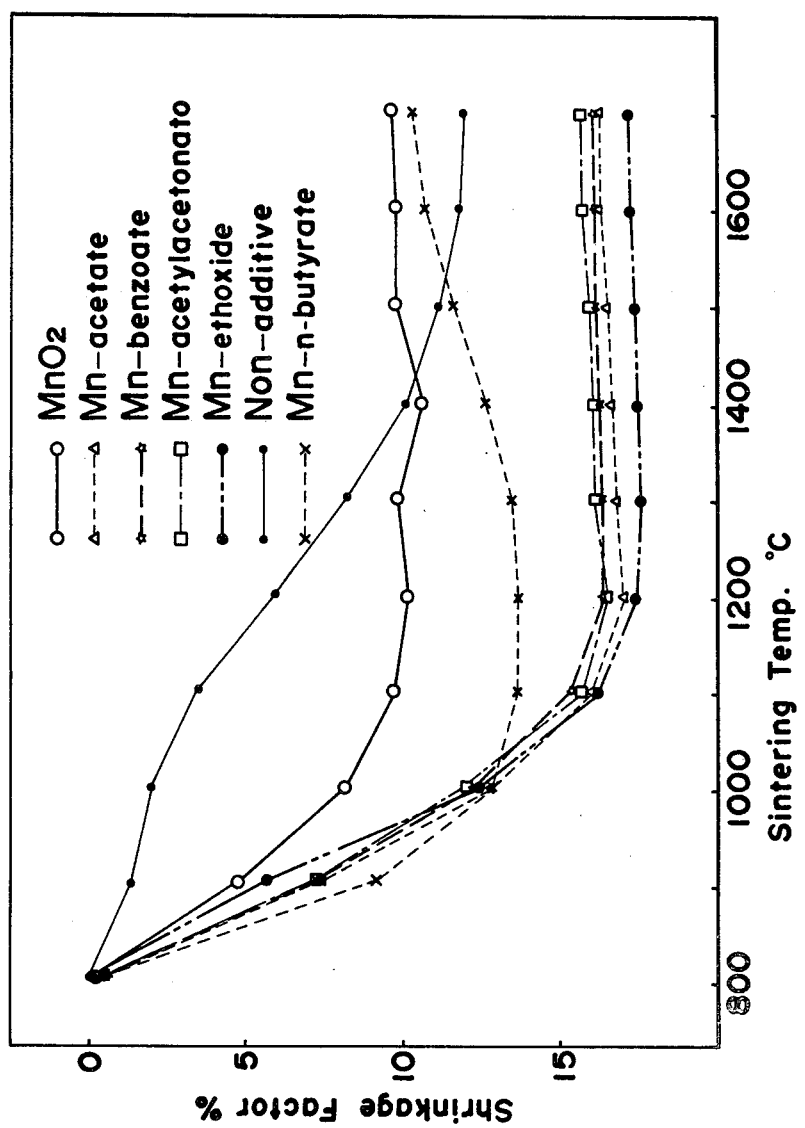
FIG. 3 is a graph showing the relation between the sintering temperature and the shrinkage factor of the sintered pellet.

FIG. 2 is a graph showing the relation between the sintering temperature and the relative density when various kinds of manganese compounds are added to the mixed powder of PuO$_2$ and UO$_2$. On the other hand, the relation between the sintering temperature and the shrinkage factor is shown in a graph as illustrated in FIG. 3. The manganese compounds as shown in FIGS. 2 and 3 are added in an amount, as MnO$_2$, of 0.5% by weight based on the weight of the mixed powder of PuO$_2$ and UO$_2$. The sintering atmosphere is a mixed gas consisting of 5% H$_2$ and 95% N$_2$. The retention time at each sintering temperature is one hour. The density and shrinkage factor of the sintered pellet are determined by keeping the pellet at a predetermined temperature, then cooling it down to room temperature and measuring its size and weight. The shrinkage factor ($\Delta H/H$, %) is calculated by the following equation:

$$\Delta H/H = 100 \times (H_t - H_g)/H_g$$

Where
  $H_g$: height of green pellet, and
  $H_t$: height of pellet at T°C.

In these pellet samples, the content of PuO$_2$ in the PuO$_2$-UO$_2$ mixed powder is 28.5% by weight. It can be seen from FIGS. 2 and 3 that the pellet samples produced by adding the manganese compounds exhibit substantially the same tendency, and both the relative density and the shrinkage factor reach substantially fixed values at a temperature of at least 1,200° C. This tendency is remarkable different from the pellet sample to which no manganese compound is added. In FIG. 3, some differences are seen in the shrinkage factor between the pellet sample containing manganese dioxide and the pellet samples containing other manganese compounds. It is assumed that the differences are caused due to the presence or absence of carbon, the differences of the decomposition temperature and density, and so forth.

It has been further confirmed that the pellet samples produced by adding manganese compounds other than those shown in FIGS. 2 and 3 also exhibit substantially the same result, whether the manganese compounds are inorganic or organic, and that the effect of addition of the manganese compounds is revealed when it is added in an amount of at least 0.01% by weight.

For comparison, magnesium oxide, zirconium oxide, ferric oxide and the like were employed in place of the manganese compounds, but the pellet samples containing these compounds exhibit relative density substantially the same as that of the pellet sample not containing the manganese compounds and show a tendency remarkably different from that of the pellet samples containing the manganese compounds.

As described in detail in the foregoing, the present invention can provide a method of producing a nuclear fuel pellet having a low density of 70 to 90% T.D. with a high reproducibility. In addition, the fuel pellet produced by the method of the present invention hardly exhibits any dimentional change in the re-sintering test at 1,700° C. even if the pellet was sintered at 1,200° C. Accordingly, the fuel pellet produced by the present invention is extremely useful as a nuclear fuel for a nuclear reactor in which high burnup is particularly required.

It is to be understood that the foregoing description is a preferred embodiment of the invention and that various changes and modifications may be made in the invention without departing from the scope of the appended claims.

What is claimed is:

1. A method of producing an oxide fuel pellet having a low density comprising the steps of adding a manganese compound to an oxide fuel powder selected from a group consisting of uranium dioxide powder and a mixed powder of uranium dioxide and plutonium dioxide, in an amount of 0.01 to 5.0% by weight based on the weight of the oxide fuel powder, molding the resulting mixture into a pellet form, and sintering the pellet-formed mixture at a temperature of 1,200° to 1,700° C.

2. The method according to claim 1, wherein said manganese compound is an inorganic manganese compound.

3. The method according to claim 2, wherein said inorganic manganese compound is selected from a group consisting of manganese dioxide and manganese carbonate.

4. The method according to claim 1, wherein said manganese compound is an organic manganese compound.

5. The method according to claim 4, wherein said organic manganese compound is selected from a group consisting of manganese formate, manganese acetate, manganese butyrate, manganese benzoate, manganese acetylacetonate and manganese alkoxides.

* * * * *